United States Patent [19]

Cooper et al.

[11] 4,315,084

[45] Feb. 9, 1982

[54] POLYPHENYLENE ETHER MOLDING COMPOSITIONS THAT INCLUDE AN ALKENYL AROMATIC RESIN AND EPDM RUBBER

[75] Inventors: Glenn D. Cooper, Delmar; Gim F. Lee, Jr., Albany; Rainey A. Shufelt, Coeymans, all of N.Y.

[73] Assignee: General Electric Company, Selkirk, N.Y.

[21] Appl. No.: 111,983

[22] Filed: Jan. 14, 1980

[51] Int. Cl.³ .................... C08F 8/00; C08L 61/04
[52] U.S. Cl. .................... 525/69; 260/4 R; 260/4 AR; 260/37 R; 260/42; 260/42.18; 260/42.22; 260/45.7 P; 525/68; 525/132; 525/152; 525/210

[58] Field of Search ............... 525/132, 152, 68, 69, 525/210; 260/42.37, 45.7 P, 42.18, 42.22, 4 R, 4 AR; 252/609

[56] References Cited

U.S. PATENT DOCUMENTS 3,383,435  5/1968  Cizek ............................ 525/68
3,981,341  9/1976  Abolins et al. ............... 525/68

FOREIGN PATENT DOCUMENTS 165110  2/1975  Czechoslovakia .......... 525/68

*Primary Examiner*—J. Ziegler
*Attorney, Agent, or Firm*—Hedman, Casella, Gibson & Costigan

[57] ABSTRACT

Novel molding compositions are disclosed which comprise a polyphenylene ether resin, an alkenyl aromatic resin and EPDM rubber.

16 Claims, No Drawings

POLYPHENYLENE ETHER MOLDING COMPOSITIONS THAT INCLUDE AN ALKENYL AROMATIC RESIN AND EPDM RUBBER

BACKGROUND OF THE INVENTION

The term "polyphenylene ether resin" is descriptive of a well known group of polymers that may be made by a variety of catalytic and non-catalytic processes. By way of illustration, certain of the polyphenylene ethers are disclosed in Hay, U.S. Pat. Nos. 3,306,874 and 3,306,875, and in Stamatoff, U.S. Pat. Nos. 3,257,357 and 3,257,358. In the Hay patents, the polyphenylene ethers are prepared by an oxidative coupling reaction comprising passing an oxygen-containing gas through a reaction solution of a phenol and a metal-amine complex catalyst. Other disclosures relating to processes for preparing polyphenylene ethers are found in Fox, U.S. Pat. No. 3,356,761; Sumitomo, U.K. Pat. No., 1,291,609; Bussink et al., U.S. Pat. Nos. 3,337,499; Blanchard et al., 3,219,626; Laakso et al., 3,342,892; Borman, 3,344,166; Hori et al., 3,384,619; Faurote et al., 3,440,217; and disclosures relating to metal based catalysts which do not include amines, are known from patents such as Wieden et al., U.S. Pat. No. 3,442,885 (copper-amidines): Nakashio et al., U.S. Pat. No. 3,442,885 (copper-amidines): Nakashio et al., U.S. Pat. No. 3,573,257 (metal-alcoholate or phenolate); Kobayashi et al., U.S. Pat. No. 3,455,880 (cobalt chelates); and the like. In the Stamatoff patents, the polyphenylene ethers are produced by reacting the corresponding phenolate ion with an initiator, such as a peroxy acid salt, an acid peroxide, a hypophalite, and the like, in the presence of a complexing agent. Disclosures relating to non-catalytic processes, such as oxidation with lead dioxide, silver oxide, etc., are described in Price et al., U.S. Pat. Nos. 3,382,212. Cizek, U.S. Pat. No. 3,383,435 discloses compositions of polyphenylene ethers and styrene resins. All of the above-mentioned disclosures are incorporated herein by reference.

In Czechoslovakian Pat. No. 165,110 there are described compositions of a polyphenylene ether resin; polystyrene or high impact polystyrene; and either an ethylene-propylene copolymer, polyisobutylene or an α-olefin copolymer. U.S. Pat. Nos. 3,943,191; 4,101,503; 4,101,504; 4,101,505 and 4,102,850 all disclose compositions that include a polyphenylene ether resin and an alkenyl resin that is modified with an interpolymerized EPDM rubber.

The applicants have found that when a composition of a polyphenylene ether, and an alkenyl aromatic resin is modified by the inclusion of a small quantity of an EPDM rubber, the resulting compositions have improved Izod and Gardner impact strength and ductility as compared to analogous compositions prepared with ethylene propylene rubber. The invention also includes compositions of a polyphenylene ether resin, a phosphate compound and an EPDM rubber and optionally a thermoplastic rubber.

Accordingly, it is a primary object of this invention to provide thermoplastic molding compositions of a polyphenylene ether resin, an alkenyl aromatic resin and an EPDM rubber.

It is also an object of this invention to provide a reinforced and flame retardant molding composition of a polyphenylene ether resin, an alkenyl aromatic resin and an EPDM rubber.

DETAILED DESCRIPTION OF THE INVENTION

The compositions of the inventions comprise:
(a) a polyphenylene ether resin;
(b) an alkenyl aromatic resin; and
(c) a rubbery interpolymer of a mixture of mono-olefins and a polyene.

The polyphenylene ether resins are polymers having units of the formula:

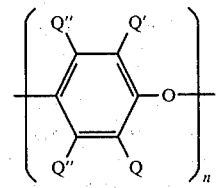

wherein Q is selected from the group consisting of hydrogen, hydrocarbon radicals, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus, Q' and Q" are the same as Q and in addition halogen with the proviso that Q and Q' are both free of a tertiary carbon atom and n is an integer of at least 50.

The preferred polyphenylene ether resin is a poly(2,6-dimethyl-1,4-phenylene) ether resin having an intrinsic viscosity of from about 0.40 dl/g to about 0.65 dl/g as measured in chloroform at 30° C.

The alkenyl aromatic resin will have at least 25% of its units derived from monomers of the formula:

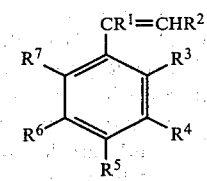

wherein $R^1$ and $R^2$ are selected from the group consisting of lower alkyl or alkenyl groups of from 1 to 6 carbon atoms and hydrogen; $R^3$, $R^4$ and $R^5$ are selected from the group consisting of chloro, bromo, hydrogen and (lower) alkyl of from 1 to 6 carbon atoms; $R^6$ and $R^7$ are selected from the group consisting of hydrogen and (lower) alkyl and alkenyl groups of from 1 to 6 carbon atoms or $R^5$ and $R^6$ may be concatenated together with hydrocarbyl groups to form a naphthyl group. Styrene is the preferred alkenyl aromatic compound.

An α,β-unsaturated cyclic anhydride may be copolymerized with the vinyl aromatic compound. These compounds may be represented by the formula:

wherein the dotted lines represent a single or double carbon to carbon bond, $R^7$ and $R^8$ taken together represents a

linkage, $R^9$ is selected from the group consisting of hydrogen, vinyl, alkyl, alkenyl, alkylcarboxylic or alkenylcarboxylic of from 1 to 12 carbon atoms, n is 1 or 2, depending on the position of the carbon-carbon double bond, and m is an integer of from 0 to about 10. Amounts from 0 to 1 part per weight of anhydride per part by weight of alkenyl aromatic resin may be used. Examples include maleic anhydride, citraconic anhydride, itaconic anhydride, aconitic anhydride and the like.

Rubber may be employed in preparing the rubber-modified polymers of a vinyl aromatic compound such as polybutadiene rubber, butyl rubber, styrene-butadiene rubber, acrylonitrile rubber, ethylene propylene copolymers, natural rubber, EPDM rubbers, polysulfide rubber, propylene oxide and the like. The rubber may be present at from 0.5 to 25 parts per weight per 100 parts of alkenyl aromatic resin.

The EPDM rubbers are rubbery interpolymers comprising mixtures of mono-olefins and a polyene including those prepared from ethylene, an alpha-olefin and a polyene. Preferred types comprise 10–90 mole percent of ethylene, 10–90 mole percent of an alpha-olefin containing 3–16 carbon atoms, and 0.1–12 mole percent of a polyene that is a non-conjugated cyclic or open-chain diene having 5–20 carbon atoms. Especially preferred are those alpha-olefins having 3–10 carbon atoms and non-conjugated cyclic or open-chain dienes having 5–10 carbon atoms.

Useable EPDM rubbers include the ethylene-propylene-ethylidene norbornene terpolymer and those described in Ritchie, Vinyl and Allied Polymers, Vol. 1 page 121 (1968) which is incorporated by reference. The preferred EPDM rubbery interpolymers are those comprising ethylene, propylene and 5-ethylidene-2-norbornene; or ethylene, propylene and 1,4-hexadiene; and of ethylene, propylene and dicyclopentadiene.

The compositions of the invention may comprise from 10 to 90 parts by weight and more preferably from 40 to 65 parts by weight of the polyphenylene ether resin component; from 90 to 10 parts by weight and more preferably from 35 to 60 parts by weight of the alkenyl aromatic resin; and from 1 to 15 and more preferably from 2 to 10 parts by weight of the rubbery interpolymer of a mixture of mono-olefins and a diene. All references herein to parts are to parts by weight.

If desired, reinforcing fillers may be added to the composition in reinforcing amounts such as from 1 to 40 parts by weight per 100 parts by weight of total composition of fibrous glass, quartz, metal fibers, wollastonite or the fillers mentioned in U.S. Pat. No. 4,080,351 column 3 and 4, which is incorporated by reference. Flame retardants such as those described in U.S. Pat. No. 3,833,535 which is incorporated in the composition of the invention may also be present in addition to non-reinforcing fillers.

Phosphates may be utilized in combination with the polyphenylene ether and the EPDM rubbery interpolymers and optionally a thermoplastic rubber. Suitable phosphates include phosphates of the formula:

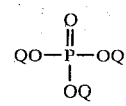

and nitrogen analogs thereof where each Q represents the same or different radicals including hydrocarbon radicals such as alkyl, cycloalkyl, aryl, alkyl substituted aryl, and aryl substituted alkyl; and combinations thereof provided that at least one of said Q's is aryl. Typical examples of suitable phosphates include, phenylbisdodecyl phosphate, phenylbisneopentyl phosphate, phenylbis 3,5,5'-trimethylhexyl phosphate), ethyldiphenyl phosphate, 2-ethylhexyl di(p-tolyl) phosphate, bis(2-ethylhexyl) p-tolylphosphate, tritolyl phosphate, bis(2-ethylhexyl)-phenyl phosphate, tri-(nonylphenyl) phosphate, di(dodecyl) p-tolyl phosphate, tricresyl phosphate, triphenyl phosphate, halogenated triphenyl phosphate, dibutylphenyl phosphate, 2-chloroethyldiphenyl phosphate, p-tolyl bis(2,5,5'-trimethylhexyl) phosphate, 2-ethylhexyldiphenyl phosphate, and the like. The preferred phosphates are those where each Q is aryl. The most preferred phosphate is triphenyl phosphate. A composition comprised of mixed triaryl phosphates, with one or more isopropyl groups on the aryl rings, such as Kronitex 50 supplied by FMC may also be utilized. Generally these compositions will comprise from 65–95 parts by weight of the polyphenylene ether resin; from 35–5 parts by weight of the phosphate and from 1–15 parts by weight of the rubbery interpolymer of a mixture of monoolefins and a polyene alone or in combination with a thermoplastic rubber. If such a mixture is utilized, it should contain a minimum of 25% by weight of the rubbery interpolymer. The thermoplastic rubbers of the ABA type with or without a saturated midblock are respectively described in U.S. Pat. Nos. 3,646,162 and 3,595,942 which are incorporated by reference.

The compositions may be prepared by tumble blending the components with or without suitable reinforcing agents, stabilizers, pigments, fillers, flame retardants, plasticizers or extrusion aids. The blended components may then be extruded into a continuous strand, the strands are chopped into pellets and the pellets may be molded to any desired shape.

DESCRIPTION OF THE PREFERRED EMBODIMENTS

Example 1

50 parts of poly(2,6-dimethyl-1,4-phenylene) ether[1], 50 parts of a high impact polybutadiene modified polystyrene[2] and 5 parts of a modifier (either polyethylene, EPR[3], or EPDM[4]) were extruded and molded. For comparison, a fourth blend was prepared with 1.5 instead of 5 parts of polyethylene. Each blend also contained 3 parts triphenyl phosphate, 1 part diphenyl decyl phosphite, 0.15 parts of zinc sulfide and 0.15 parts of zinc oxide. Properties of the blends are listed in Table 1. The EPDM is much more effective in increasing impact strength of 50:50 blends than either polyethylene or EPR. 5% polyethylene caused extensive lamination of the blends; lamination was not observed with EPDM at this level.

1. PPO General Electric Company IV 0.45–0.55 in CHCl$_3$ at 30° C.
2. Foster Grant 834
3. Vistalon 702 (Exxon) a copolymer of ethylene and propylene containing 75 mol percent ethylene.

4. Nordel 1500 (Dupont) terpolymer of ethylene, propylene and 1,4-hexadiene containing about 80 mol percent ethylene, 13 mol percent propylene and 7 mol percent hexadiene.

TABLE 1

| Additive | Parts | T.Y. (psi) | Elong. (%) | Izod Impact (ft.lbs/in.n.) | Gardner Impact (in-lbs) |
|---|---|---|---|---|---|
| 1. polyethylene* | 1.5 | 9000 | 78 | 4.8 | 160 |
| 2. polyethylene* | 5.0 | 7100 | 24 | 4.7 | <10 |
| 3. EPR* | 5.0 | 8100 | 36 | 4.9 | 80 |
| 4. EPDM | 5.0 | 8600 | 60 | 5.7 | 150 |

*Control

Example 2

A composition containing 90 parts by weight of a poly (2,6-dimethyl-1,4-phenylene) ether resin and 10 parts of triphenylphosphate, and blends of 90 parts of a poly(2,6-dimethyl-1,4-phenylene) ether resin, 10 parts of triphenylphosphate and 5 parts of either Chemplex 1086 polyethylene, EPR[1] or EPDM[2] rubber were extruded, molded and tested, with the results shown in Table 2. Extensive lamination was observed in the blends containing polyethylene, but was less apparent in the blend containing the EPR, and was not observed in the blend containing EPDM. Ductility (elongation), Izod impact and Gardner impact were improved by addition of Nordel 1500. Gardner impact strength was almost five times greater with Nordel 1500 than with any of the other additives.
1. Vistalon 702
2. Nordel 1500

TABLE 2

| Additive | T.Y. (psi) | Elong. (%) | Izod Impact (ft.lbs/in.n.) | Gardner Impact (in-lbs) |
|---|---|---|---|---|
| None | 12,000 | 56 | 1.2 | 75 |
| 5. polyethylene* | 10,500 | 52 | 2.5 | <10 |
| 6. EPR* | 10,600 | 90 | 2.4 | 80 |
| 7. EPDM | 10,700 | 95 | 2.4 | 230 |

*Control

Example 3

A composition of 91 parts poly(2,6-dimethyl-1,4-phenylene) ether, 9 parts triphenylphosphate, 0.15 parts zinc sulfide, 0.15 parts zinc oxide and 10 parts of a triblock copolymer[1] was extruded and molded. Another blend was also prepared, of the same composition except that the 10 parts of the triblock were replaced by a mixture of 5 parts of the triblock and 5 parts of EPDM rubber[2], and a third with the 10 parts of the triblock replaced by 10 parts of EPDM. Properties of the blends are given in Table 3. The effect of replacing part or all of the triblock with EPDM is a slight increase in Izod impact and a slight decrease in Gardner impact strength.
1. Kraton G 1651
2. Nordel 1500

TABLE 3

| | T.Y. (psi) | Elong (%) | Izod (ft.lbs/in) | Gardner (in-lbs) |
|---|---|---|---|---|
| 8. triblock* | 10,400 | 63 | 3.8 | 230 |
| 9. triblock/EPDM 50/50 | 10,100 | 76 | 4.6 | 210 |
| 10. EPDM | 9,800 | 75 | 6.2 | 170 |

*Control

Example 4

Compositions of 78 parts of poly(2,6-dimethyl-1,4-phenylene) ether; 22 parts of triphenyl phosphate and 10 parts of the specified EPDM rubber were extruded and molded along with a control blend that did not contain any EPDM rubber.

| EPDM Rubber | Izod Impact (ft.lbs/⅛″ notch) | Gardner Impact (in-lbs) |
|---|---|---|
| 11. Nordel 1500 | 5.8 | 170 |
| 12. Epcar 847* | 5.2 | 150 |
| 13. None** | 1.2 | 50 |

*Epcar 847 is a terpolymer of ethylene propylene and 5-ethylidene-2-norbornene containing about 65% ethylene, 30% propylene and 5% of 5-ethylidene-2-norbornene.
**Control

Example 5

Compositions of 55 parts poly(2,6-dimethyl-1,4-phenylene) ether; 45 parts of an EPDM modified high impact polystyrene and 5 parts of Nordel 1500 EPDM rubber was extruded and molded. A control composition that did not contain any of the Nordel 1500 EPDM rubber was also prepared. These compositions had the following properties:

| | EPDM rubber | Elongation | Izod Impact (ft.lbs/⅛″ notch) | Gardner Impact |
|---|---|---|---|---|
| 14. | Nordel 1500 | 77% | 7.0 | 280 |
| 15.* | None | 81% | 4.0 | 250 |

*Control

Obviously many variations will suggest themselves to those skilled in the art from the above detailed description without departing from the scope or spirit of the invention. It is, therefore, to be understood that changes may be made in the particular embodiments of the invention as defined by the appended claims.

We claim:

1. A thermoplastic molding composition which comprises:
   (a) a polyphenylene ether resin;
   (b) an alkenyl aromatic resin; and
   (c) a rubbery interpolymer of a mixture of mono-olefins and a polyene.

2. A thermoplastic molding composition as defined in claim 1 wherein the polyphenylene ether has units of the formula:

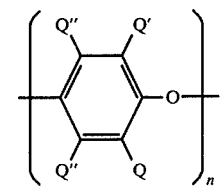

wherein Q is selected from the group consisting of hydrogen, hydrocarbon radicals, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus, Q′ and Q″ are the same as Q and in addition halogen with the proviso that Q and Q′ are both free of a tertiary carbon atom and n is an integer of at least 50.

3. A thermoplastic molding composition as defined in claim 2 wherein the alkenyl aromatic resin has at least 25% of its units derived from an alkenyl atomatic monomer of the formula:

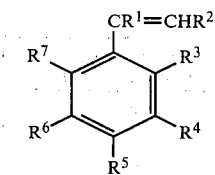

wherein $R^1$ and $R^2$ are selected from the group consisting of hydrogen and lower alkyl or alkenyl groups of from 1 to 6 carbon atoms; $R^3$, $R^4$ and $R^5$ are selected from the group consisting of chloro, bromo, hydrogen and lower alkyl group of from 1 to 6 carbon atoms; and $R^6$ and $R^7$ may be concatenated together with hydrocarbyl groups to form a naphthyl group.

4. A thermoplastic molding composition as defined in claim 3 wherein the alkenyl aromatic resin is modified by interpolymerization with a rubber selected from the group consisting of polybutadiene rubber, butyl rubber, natural rubber, polysulfide rubber, EPDM rubber, styrene-butadiene rubber, propylene oxide, acrylonitrile rubber and ethylene-propylene.

5. A thermoplastic molding composition as defined in claim 4 wherein the modified alkenyl aromatic resin is a rubber modified high impact polystyrene.

6. A thermoplastic molding composition as defined in claim 5 wherein the polyphenylene ether resin is a poly(2,6-dimethyl-1,4-phenylene) ether resin.

7. A thermoplastic molding composition as defined in claim 6 where the rubbery interpolymer is 10-90 mole percent of ethylene; 10-90 mole percent of an alpha olefin containing 3-16 carbon atoms and 1-15 mole percent of a polyene that is a non-conjugated cyclic or open chain diene of from 5-20 atoms.

8. A thermoplastic molding composition as defined in claim 7 wherein the rubbery interpolymer is derived from ethylene, propylene and hexadiene.

9. A thermoplastic molding composition which comprises:
 (a) from 10 to 90 parts by weight of a polyphenylene ether resin;
 (b) from 90 to 10 parts by weight of a rubbery modified alkenyl aromatic resin; and
 (c) from 1 to 15 parts by weight of a rubbery interpolymer of a mixture of mono-olefins and a polyene.

10. A thermoplastic molding composition as defined in claim 9 wherein the polyphenylene ether resin is a poly(2,6-dimethyl-1,4-phenylene) ether resin; the rubber modified alkenyl aromatic resin is polybutadiene high impact polystyrene and the rubbery interpolymer is derived from ethylene, propylene and 1,4-hexadiene.

11. A thermoplastic molding composition as defined in claim 1 which includes a reinforcing amount of a reinforcing filler.

12. A thermoplastic molding composition as defined in claim 11 which includes a flame retardant amount of a flame retardant agent.

13. A thermoplastic molding composition as defined in claim 1 which includes a flame retardant amount of a flame retardant agent.

14. A thermoplastic molding composition as defined in claim 7 wherein the rubbery interpolymer is derived from ethylene, propylene and 5-ethylidene-2-norbornene.

15. A thermoplastic molding composition as defined in claim 9 wherein the polyphenylene ether resin is poly(2,6-dimethyl-1,4-phenylene) ether resin; the rubber modified alkenyl aromatic resin is polybutadiene high impact polystyrene and the rubbery interpolymer is derived from ethylene, propylene and 5-ethylidene-2-norbornene.

16. A thermoplastic molding composition which comprises:
 (a) from 40 to 65 parts by weight of poly(2,6-dimethyl-1,4-phenylene) ether resin;
 (b) from 35 to 60 parts by weight of a rubber modified alkenyl aromatic resin; and
 (c) from 2 to 10 parts by weight of a rubbery interpolymer derived from ethylene, propylene and 5-ethylene-2-norborene.

* * * * *